US012651958B2

(12) United States Patent
Wang

(10) Patent No.: US 12,651,958 B2
(45) Date of Patent: Jun. 9, 2026

(54) RIPPLE CONTROL FOR A CAPACITOR BETWEEN A PFC AND A DC/DC CONVERTER

(71) Applicant: Delta Electronics (Shanghai) Co., Ltd., Shanghai (CN)

(72) Inventor: Xiaolei Wang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 152 days.

(21) Appl. No.: 18/463,304

(22) Filed: Sep. 8, 2023

(65) Prior Publication Data

US 2024/0097558 A1    Mar. 21, 2024

(30) Foreign Application Priority Data

Sep. 16, 2022    (CN) .......................... 202211129354.7

(51) Int. Cl.
   *H02M 1/14*      (2006.01)
   *H02M 1/42*      (2007.01)
   *H02M 3/337*      (2006.01)

(52) U.S. Cl.
   CPC ......... *H02M 1/143* (2013.01); *H02M 1/4208* (2013.01); *H02M 3/3374* (2013.01)

(58) Field of Classification Search
   CPC .................. H02M 1/42–4225; H02M 1/14–15
   See application file for complete search history.

(56) References Cited

U.S. PATENT DOCUMENTS 7,323,827 B2    1/2008   Nerone et al.
9,467,068 B2    10/2016   Yamagami 9,843,254 B2    12/2017   Ye et al.
2007/0152601 A1    7/2007   Nerone
2008/0112193 A1*    5/2008   Yan ................... H02M 3/33515
                                   363/21.08

(Continued)

FOREIGN PATENT DOCUMENTS

CN      102437728 A    5/2012
CN      107005149 A    8/2017

(Continued)

OTHER PUBLICATIONS

Machine translation of WO9811658 (Year: 1997).*
Machine translation of KR 201000012301 (Year: 2010).*

*Primary Examiner* — Peter M Novak

(74) *Attorney, Agent, or Firm* — CKC & Partners Co., LLC

(57) ABSTRACT

The present disclosure discloses a method and a system for controlling a switching power supply, the switching power supply comprising a power factor correction circuit which comprises at least one electrolytic capacitor, the method comprising: detecting a ripple voltage of the electrolytic capacitor; controlling an actual output power of the switching power supply to be equal to a reference output power based on the ripple voltage of the electrolytic capacitor, wherein the reference output power equals to a compensated output power or an upper limit output power, and wherein the compensated output power is obtained by comparing the ripple voltage of the electrolytic capacitor with a reference voltage and subjecting to a compensation calculation. The reference output power is a smaller one of the compensated output power and the upper limit output power.

24 Claims, 4 Drawing Sheets

(56)  References Cited

U.S. PATENT DOCUMENTS

2019/0074768 A1 *   3/2019  Yu ......................... H02M 3/156

FOREIGN PATENT DOCUMENTS

| | | | | | |
|---|---|---|---|---|---|
| CN | 109075697 | A | | 12/2018 | |
| CN | 113472190 | A | | 10/2021 | |
| CN | 113985190 | A | | 1/2022 | |
| EP | 2796006 | B1 | | 6/2016 | |
| KR | 20100012301 | A | * | 2/2010 | ................ H02J 1/02 |
| WO | WO-9811658 | A1 | * | 3/1998 | .......... H02M 3/3374 |

* cited by examiner

RIPPLE CONTROL FOR A CAPACITOR BETWEEN A PFC AND A DC/DC CONVERTER

CROSS REFERENCE TO RELATED APPLICATION

This application claims the benefit of priority to Chinese Application No. 202211129354.7, filed on Sep. 16, 2022, the content of which is incorporated herein by reference in its entirety.

BACKGROUND OF THE DISCLOSURE

1. Field of the Disclosure

The present disclosure relates to a technical field of power supply control, in particular to a method and a system for controlling a switching power supply.

2. Related Art

Electrolytic capacitor is widely used in switching power supply, such as output capacitor of PFC converter and input capacitor of grid connected inverter. The low temperature characteristics of the electrolytic capacitor are poor. When the temperature is low, its capacitance decreases sharply and the equivalent series resistance (ESR) increases sharply. At this time, high load power will cause too high ripple voltage of the electrolytic capacitor, which may easily trigger the protection, and even lead to the damage of the electrolytic capacitor. Therefore, under low temperature conditions, the electrolytic capacitor is usually preheated, that is, the load power of the switching power supply is set to operate at a low value for a period of time, so that the core temperature of the electrolytic capacitor gradually rises. After its capacitance and ESR are restored to a reasonable range, the output power is gradually increased until full load.

There are usually the following problems with the warm-up method of electrolytic capacitor: Firstly, the output power is small in the warm-up stage, needing to wait for a long time; Secondly, the identification of the ambient temperature through the controller to predict the temperature of the electrolytic capacitor requires a temperature sensor, whose accuracy requirements increase the complexity of the device; Thirdly, it is difficult to obtain the capacitance value and ESR data of the deteriorated electrolytic capacitor, especially the boundary value in the mass production process. It is difficult to ensure that the warm-up power of the switching power supply may still keep the ripple voltage within the safety limit after years of operation, so there is a potential safety hazard.

Therefore, based on the above-mentioned problems existing in the prior art, it is necessary to provide a switching power supply control mode that is safe, reliable and may quickly establish power.

SUMMARY OF THE DISCLOSURE

The purpose of the present disclosure is to provide a method and a system for controlling a switching power supply to regulate the output power according to the capacitance of the electrolytic capacitor itself and equivalent series resistance (ESR), so that the ripple voltage of the electrolytic capacitor is always kept within the safety limit by adjusting the output power of the switching power supply, thus the warm-up time is reduced, and the safe operation of the switching power supply is achieved.

In order to achieve the said purpose, the present disclosure discloses the following technical solutions:

In one aspect, the present disclosure provides a method for controlling a switching power supply, the switching power supply comprising a power factor correction circuit which comprises at least one electrolytic capacitor, and the method comprises the following steps:

detecting a ripple voltage of the electrolytic capacitor;

controlling an actual output power of the switching power supply to be equal to a reference output power based on the ripple voltage of the electrolytic capacitor, wherein the reference output power equals to a compensated output power or an upper limit output power, wherein the compensated output power is obtained by comparing the ripple voltage of the electrolytic capacitor with a reference voltage and subjecting to a compensation calculation, wherein when the compensated output power is less than the upper limit output power, the reference output power is set to be equal to the compensated output power; and when the compensated output power is greater than or equal to the upper limit output power, the reference output power is set to be equal to the upper limit output power.

In the other aspect, the present disclosure provides a system for controlling a switching power supply, the switching power supply comprising a power factor correction circuit which comprises at least one electrolytic capacitor, and the system comprises:

a detection unit configured to detect a ripple voltage of the electrolytic capacitor;

a control unit configured to control an actual output power of the switching power supply to be equal to a reference output power based on the ripple voltage of the electrolytic capacitor, so that the ripple voltage of the electrolytic capacitor is always kept within a safe limit; wherein the reference output power equals to a compensated output power or an upper limit output power, and the compensated output power is to be obtained by comparing the ripple voltage of the electrolytic capacitor with a reference voltage and subjecting to a compensation calculation, and when the compensated output power is less than the upper limit output power, the reference output power equals to the compensated output power;

when the compensated output power is greater than or equal to the upper limit output power, the reference output power equals to the upper limit output power.

The effects set out in the Summary are only those of the embodiment, not all the effects of the disclosure. One of the above described technical solutions has the following advantages or beneficial effects:

The technical solution disclosed in the present disclosure, by detecting the ripple voltage of the electrolytic capacitor of the switching power supply and regulating the output power of the switching power supply based on the ripple voltage of the electrolytic capacitor, keeps the ripple voltage of the electrolytic capacitor always within the safety limit, ensuring the safe and reliable operation of the switching power supply. Besides, by regulating the output power of the switching power supply, the present solution reduces the warm-up time of the electrolytic capacitor and improves the control efficiency and control precision of switching power supply by reducing the warm-up time of the electrolytic capacitor.

BRIEF DESCRIPTION OF THE DRAWINGS

These and additional features and advantages of the present disclosure will be more apparent in view of the following detailed description of the exemplary embodiments with reference to the drawings, in which.

DETAILED EMBODIMENTS OF THE DISCLOSURE

Figure 1:
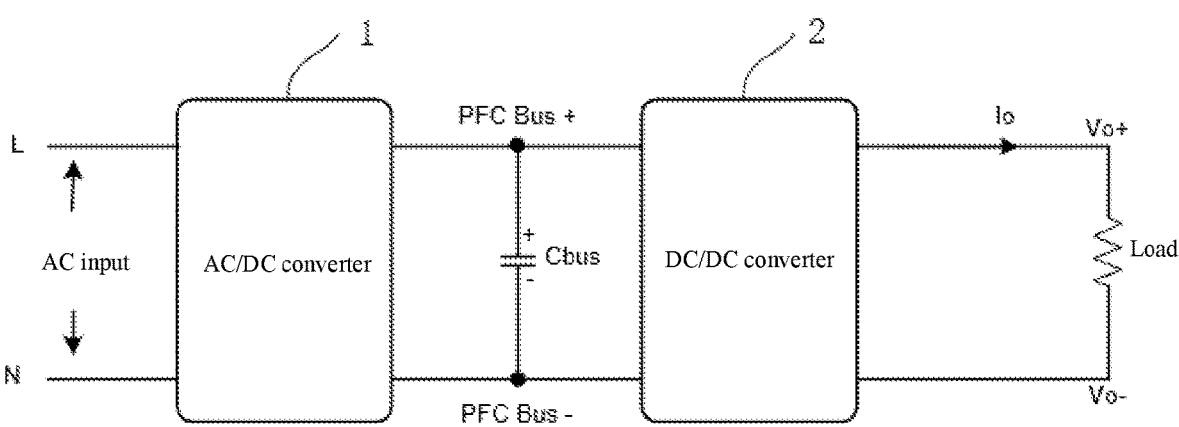
FIG. 1 is a topology diagram of single-phase AC/DC switching power supply according to an embodiment of the present disclosure.

Exemplary embodiments will now be described more fully with reference to the accompanying drawing. However, the exemplary embodiments may be implemented in many forms and should not be construed as limited to the embodiments set forth herein. On the contrary, these exemplary embodiments are provided so that this disclosure will be comprehensive and complete, and the conception of exemplary embodiments will be fully conveyed to those skilled in the art. In the drawings, the same reference numerals indicate the same or similar structures, and thus repeated descriptions thereof will be omitted.

In order to make the purpose, technical solution and advantages of the present disclosure clearer, the drawings and embodiments are described in the following for further detailed description of the present disclosure. It should be understood that various embodiments described herein are merely used to explain the present disclosure rather than limit the present disclosure.

It should be noted that references in the present description to "one embodiment", "embodiment", "example embodiment", etc. mean that the described embodiment may include specific features, structures or characteristics, but not every embodiment must contain these specific features, structures or characteristics. Furthermore, such expression does not refer to the same embodiment. Further, describing specific features, structures or characteristics in combination with embodiments has shown that it is within the knowledge of those skilled in the art to combine such features, structures or characteristics with other embodiments, no matter whether there is a clear description or not.

In addition, in the Description and subsequent claims, certain words are used to refer to specific components or parts. Those with general knowledge in the field should understand that manufacturers may use different nouns or terms to refer to the same component or part. This description and subsequent claims do not use differences in names as a way to distinguish components or parts, but differences in functions of components or parts as criteria for distinguishing. The terms "comprise" and "contain" mentioned in the entire description and the subsequent claims are open-ended terms, so they should be interpreted as "include but not limited to". In addition, the term "connection" here includes any direct and indirect means of connection. Indirect electric connection means comprises connection by means of other devices.

The principle of the present disclosure is that, by detecting a ripple voltage of electrolytic capacitor of the PFC stage in the switching power supply and regulating the output power of the switching power supply based on the ripple voltage of the electrolytic capacitor to control the peak value and valley value of the ripple voltage of the electrolytic capacitor are always within the safety limit, thus reducing the warm-up time of the electrolytic capacitor during the start process of the switching power supply, while ensuring the safe and reliable operation.

To describe the present disclosure more clearly, a single-phase AC/DC switching power supply is used as an example for the description in the following embodiment, but not as a limitation upon the present disclosure. The present disclosure may also be used for three-phase AC/DC switching power supply, single-phase or three-phase DC/AC switching power supply, etc. FIG. 1 is an equivalent circuit diagram of the AC/DC switching power supply according to an embodiment of the present disclosure. As shown in FIG. 1, a single-phase AC/DC switching power supply may be composed of two-stage converters. The first stage may be AC/DC converter 1, which realizes the PFC function, that is, PFC converter, and the second stage may be DC/DC converter 2. The capacitor connected to the output bus of the PFC comprises at least one electrolytic capacitor Cbus. The capacitor may comprise multiple electrolytic capacitors, the multiple electrolytic capacitors may be connected in parallel. In a three-phase AC/DC switching power supply, multiple electrolytic capacitors may be connected in series to form multiple groups of electrolytic capacitors, then groups may be connected in parallel. The connection mode of the electrolytic capacitors in the present disclosure is not subject to such limitation. Because the electrolytic capacitor may be equivalent to a combination of capacitor and ESR (equivalent series resistor) under the low-frequency (the frequency is grid frequency or double grid frequency), a ripple voltage Vpp will be generated on ESR due to a ripple current flowing through the ESR. Specifically, the electrolytic capacitor may be equivalent to a combination of an ideal capacitor and a parasitic resistance in series under low-frequency, and the parasitic resistance is the equivalent series resistance ESR. On the one hand, the ripple current flows through the ideal capacitor, and its charging and discharging processes will produce the ripple voltage. The ripple voltage is $90°$ lagged behind of the ripple current, and the larger the ripple current is, the larger the ripple voltage is. On the other hand, ripple current flowing through the parasitic resistance will also produce ripple voltage. For the resistance, the ripple voltage and ripple current have the same phase, and the larger the ripple current is, the larger the ripple voltage is. Therefore, the ripple voltage of electrolytic capacitor is the vector sum of ideal capacitor ripple voltage and parasitic resistance ripple voltage, thus the larger the ripple current is, the larger the ripple voltage of electrolytic capacitor is.

Figure 2:
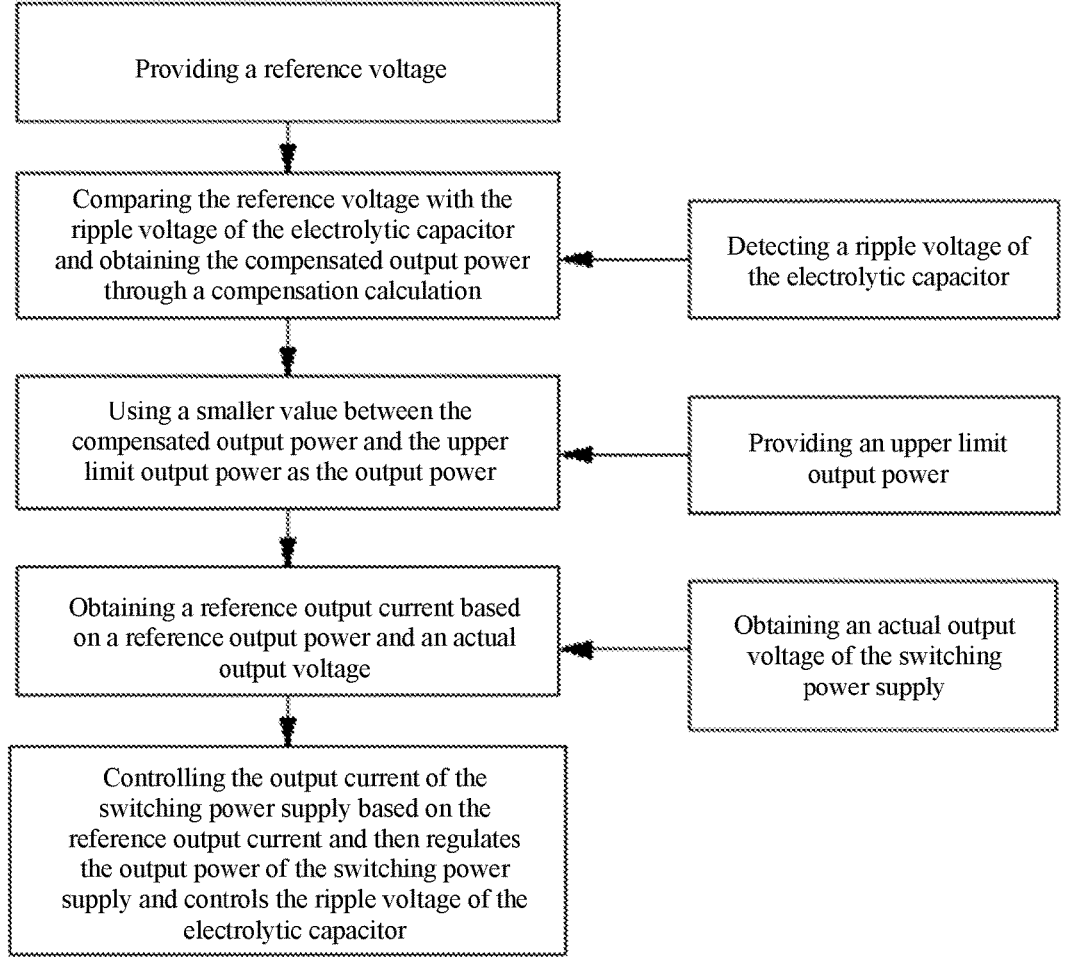
FIG. 2 is a control schematic diagram of AC/DC switching power supply according to an embodiment of the present disclosure.

FIG. 2 is a control schematic diagram of the AC/DC switching power supply according to an embodiment of the present disclosure, as shown in the figure: a reference voltage may be provided, and a compensated output power may be obtained by compensation calculation after detecting the ripple voltage of the electrolytic capacitor and comparing the detected ripple voltage with the reference voltage; an upper limit output power may be provided, and the smaller value between the compensated output power and the upper limit output power may be taken as the reference output power for the switching power supply; the actual output voltage of the switching power supply may be obtained, and the reference output current may be obtained based on reference output power and the actual output voltage of the switching power supply; the second stage converter of the switching power supply controls the output current of the switching power supply based on the reference output current, and then regulates the output power of the switching power supply and controls the ripple voltage of the electrolytic capacitor of the first stage converter.

Figure 3:
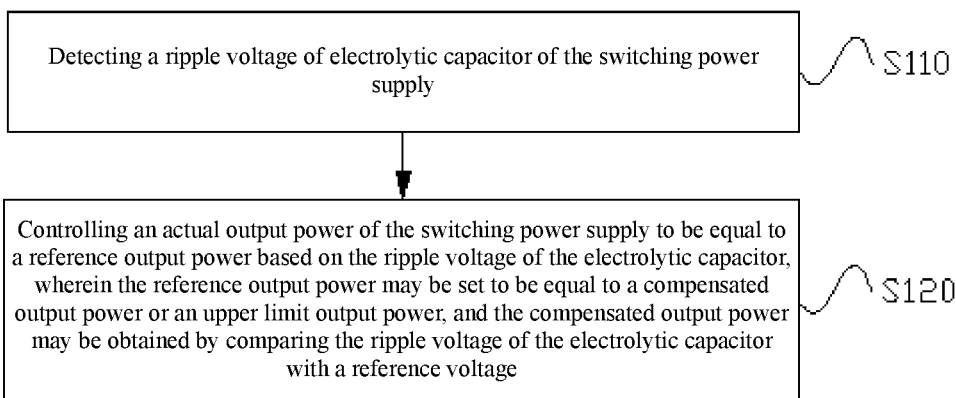
FIG. 3 is a flow diagram of a method for controlling the switching power supply according to an embodiment of the present disclosure.

Referring to FIG. 3, which shows a flow diagram of a method for controlling the switching power supply according to an embodiment of the present disclosure, wherein the method includes the following steps:

S110: detecting a ripple voltage of an electrolytic capacitor in the switching power supply;

S120: controlling an actual output power of the switching power supply to be equal to a reference output power P_ref of the switching power supply based on the ripple voltage of electrolytic capacitor, wherein the reference output power may be set to be equal to a compensated output power P_error or an upper limit output power P_limit, and wherein the compensated output power P_error may be obtained by comparing the ripple voltage of the electrolytic capacitor with a reference voltage and subjecting to a compensation calculation.

Here, when the compensated output power is less than the upper limit output power, the reference output power P_ref may be set to be equal to the compensated output power P_error; and when the compensated output power is greater than or equal to the upper limit output power, the reference output power P_ref may be set to be equal to the upper limit output power P_limit.

When the PFC converter is operating, an average value of its output voltage may be a constant value. That is, the average voltage Vavg of the electrolytic capacitor may be a constant value. The output voltage of the PFC converter (that is, the electrolytic capacitor voltage) may be the superposition of an average value of the electrolytic capacitor voltage and the ripple voltage Vpp of the electrolytic capacitor. Since the output power of the first stage power supply is positively related to the output power of the second stage power supply, the greater the output power of the second stage power supply is, the greater the output power of the first stage power supply is, the greater the output current of the first stage power supply, the greater the ripple current flowing through the electrolytic capacitor is, and the greater the ripple voltage of the electrolytic capacitor is. Therefore, by regulating the output power of the second stage converter to control the output power of the first stage converter, and then control the ripple current of the electrolytic capacitor, the ripple voltage of the electrolytic capacitor may always be controlled within the range that may ensure the safe operation of the switching power supply. It is preferable that the electrolytic capacitor voltage may be controlled to less than a setting value of an overvoltage protection for the PFC output and greater than a minimum value of input voltage of the switching power supply under normal operation, and the ripple voltage of the electrolytic capacitor is less than a rated ripple voltage.

In some embodiments, the method for controlling the switching power supply also includes controlling the output current of the switching power supply, and for the output current of the switching power supply, the reference output current I_ref may be obtained based on the reference output power of the second stage P_ref of the switching power supply and the real-time sampled output voltage of the switching power supply. The second stage converter controls the output current based on the reference output current I_ref, that is, the output power of the first stage converter is controlled through the control of the output power of the second stage converter, and then the ripple voltage of the electrolytic capacitor is controlled.

Figure 4:
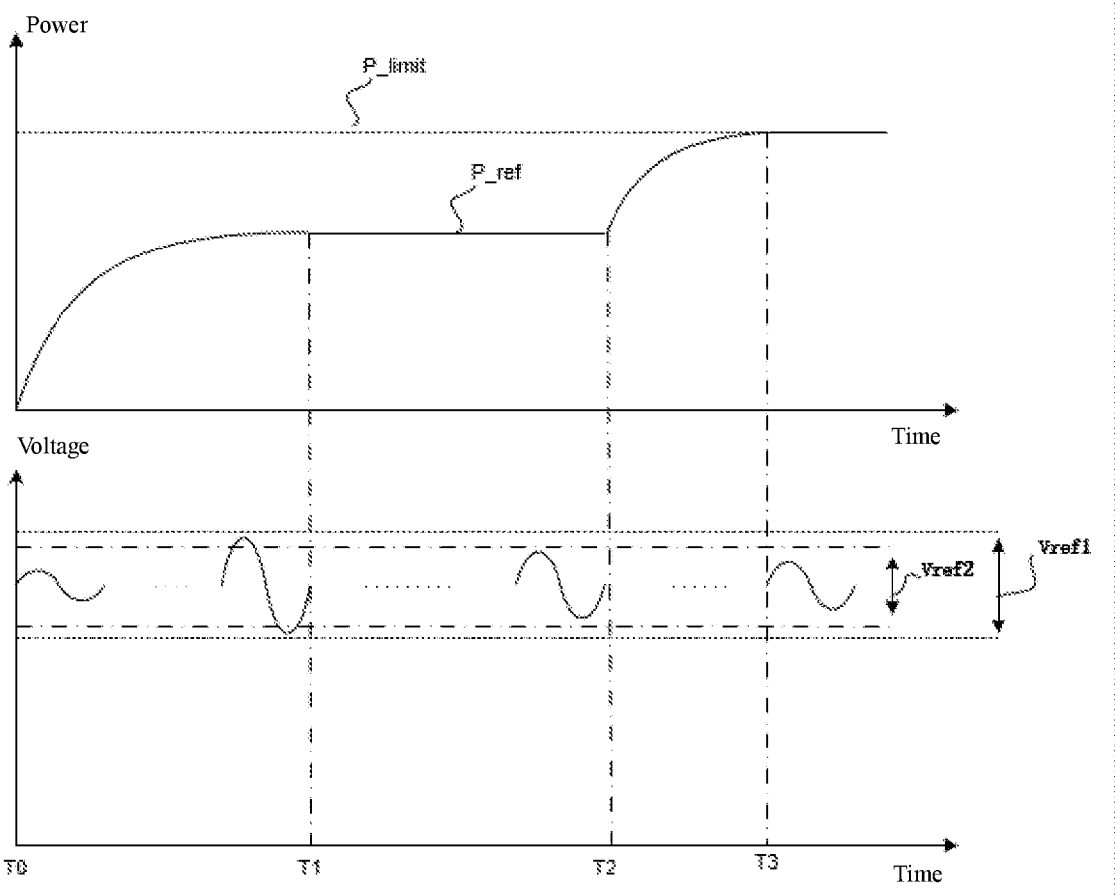
FIG. 4 is a schematic diagram of a switching power supply control process when the upper limit output power is a constant value.
Figure 5:
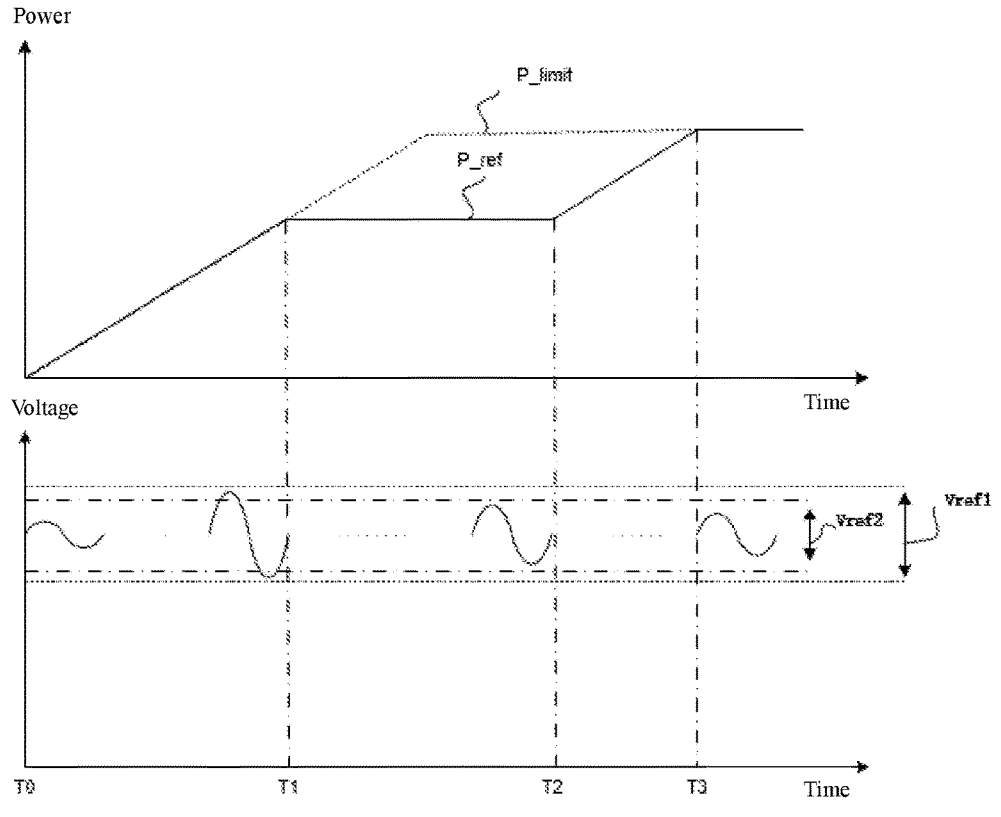
FIG. 5 is a schematic diagram of a switching power supply control process when the upper limit output power is an increasing function.

In some embodiments, the value of the upper limit output power may be a constant value, as shown in FIG. 4. For example, but not limited to this, the constant value may be a rated output power of the switching power supply. When the value of the upper limit output power is a constant value, the ripple voltage of the electrolytic capacitor is less than the reference output power during the start-up of the switching power supply, reference output power as the compensated output power keeps increasing, thus the output power may reach the rated output power earlier. In some other embodiments, the upper limit output power may also be a gradually increasing function from an initial power value to a rated output power of the switching power supply. As shown in FIG. 5, when the compensated output power is greater than the upper limit output power, the reference output power may be controlled equal to the value of the upper limit output power according to the function of the upper limit. The output power increases according to the set power growth curve of the upper limit output power function. Compared to implementations with a constant value for the upper output power, the increment of the output power may be smoother. The curve of the function may include a linear increase curve, a stepwise increment curve or a nonlinear increment curve, which is not a limit on the present disclosure.

Further, in step S120, the ripple voltage of the electrolytic capacitor may be obtained to compare with the reference voltage in each sampling cycle, and then the compensated output power may be calculated. In some embodiments, the reference voltage includes a first reference voltage. If the ripple voltage of the electrolytic capacitor is greater than the first reference voltage, the compensated output power may gradually decrease and the ripple voltage of the electrolytic capacitor may be repeatedly obtained in the next sampling cycle. If the ripple voltage of the electrolytic capacitor is less than or equal to the first reference voltage, the compensated output power may gradually increase. In some other embodiments, the reference voltage includes a first reference voltage and a second reference voltage, and the first reference voltage is greater than the second voltage. If the ripple voltage of the electrolytic capacitor is greater than the first reference voltage, the compensated output power may gradually decrease and the ripple voltage of the electrolytic capacitor may be repeatedly obtained in the next sampling cycle. When the electrolytic capacitor voltage is less than or equal to the first reference voltage and greater than or equal to the second reference voltage, the compensated output power may be controlled to be maintained and the electrolytic capacitor voltage may to be obtained repeatedly in the next sampling cycle; and when the ripple voltage of the electrolytic capacitor is less than the second reference voltage, the compensated output power may gradually increase.

Under the low frequency operation, the electrolytic capacitor voltage of the first stage converter may be equivalent to the superposition of an average value of the electrolytic capacitor voltage and the ripple voltage Vpp of the electrolytic capacitor. In some embodiments, the ripple voltage of the electrolytic capacitor may also be obtained from the peak to peak value, peak value or valley value of the electrolytic capacitor voltage.

In some embodiments, in step S120, the peak to peak voltage of the electrolytic capacitor voltage may be used to obtain the ripple voltage of the electrolytic capacitor in each sampling cycle, and perform the compensation calculation for the current compensated output power, which specifically include:

> providing the reference voltage comprising a first reference voltage and a second reference voltage;
> an electrolytic capacitor voltage of the switching power supply comprises the ripple voltage of the electrolytic capacitor;
> when a peak to peak value of the electrolytic capacitor voltage is greater than the first reference voltage, controlling to decrease the compensated output power and obtaining the electrolytic capacitor voltage repeatedly;
> when the peak to peak value of the electrolytic capacitor voltage is less than or equal to the first reference voltage and greater than or equal to the second reference voltage, controlling to maintain the compensated output power and obtaining the electrolytic capacitor voltage repeatedly;
> when the peak to peak value of the electrolytic capacitor voltage is less than the second reference voltage, controlling to increase the compensated output power and obtaining the electrolytic capacitor voltage repeatedly;
> wherein the first reference voltage may be set less than a first threshold voltage, the second reference voltage may be set greater than a second threshold voltage, and the first reference voltage may be greater than or equal to the second reference voltage.

Figure 6:
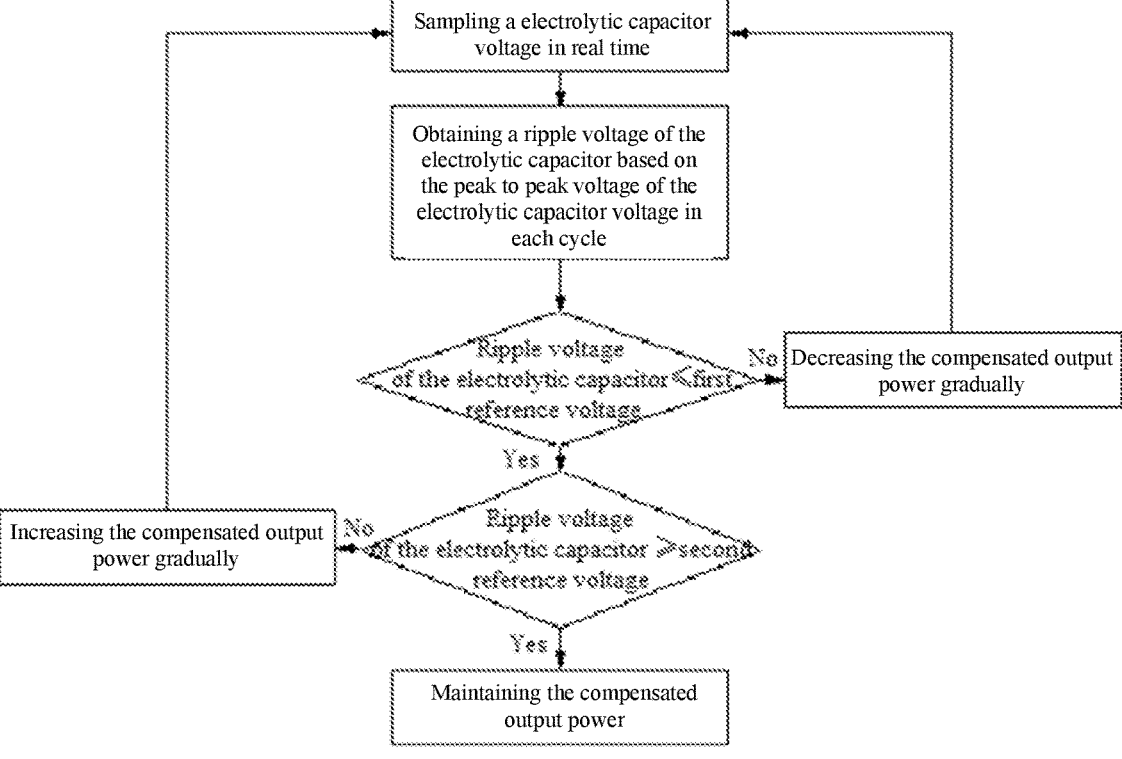
FIG. 6 is a flow diagram of obtaining the ripple voltage through the peak to peak value of the electrolytic capacitor voltage to perform compensation calculation according to an embodiment of the present disclosure.

FIG. 6 is a flow diagram of obtaining the ripple voltage through the peak to peak value of the electrolytic capacitor voltage to perform compensation calculation of the compensated output power according to an embodiment of the present disclosure in a low temperature environment, which is used to further elaborate the above control process. Referring to FIG. 6, in which the electrolytic capacitor voltage is real time sampled and the peak and peak values of the ripple voltage of the electrolytic capacitor may be obtained in each sampling cycle, which the period of the sampling cycle based upon the grid frequency or twice the grid frequency. FIG. 4 is a schematic diagram of control process of obtaining the ripple voltage of the electrolytic capacitor through the peak to peak value of the electrolytic capacitor voltage to perform compensation calculation of the compensated power according to an embodiment of the present disclosure. Referring to FIG. 4, in which the upper limit of output power may be set to be a constant value, the reference voltage includes a first reference voltage Vref_1 and a second reference voltage Vref_2. From the time T0 to T1, the output power of switching power increases according to the compensated output power. When the sampled ripple voltage Vpp is less than Vref_2, the compensated output power may be controlled to increase; From the time T1 to T2, as the output power keeps increasing, Vpp keeps increasing under low temperature. When the sampled ripple voltage Vpp is greater than or equal to Vref_2 and less than or equal to Vref_1, the compensated output power may be controlled to be maintained, the compensated output power is less than the upper limit output power, and the output power of the switching power supply is maintained. With the continuously operation of the switching power supply, the ripple current flowing through the electrolytic capacitor makes its core temperature gradually increase. Accordingly, even if the output power of the switching power supply is maintained, the ripple voltage Vpp of the electrolytic capacitor gradually decreases. At the time T2, Vpp is less than the reference voltage Vpp_ref (Vref_1 or Vref_2) at T2, the compensated power may be controlled to gradually increase. Until T3, the compensated power is equal to the upper limit output power, the switching power supply may be controlled to output the upper limit output power.

FIG. 5 is a schematic diagram of control process of obtaining the ripple voltage of the electrolytic capacitor through the peak to peak value of the electrolytic capacitor voltage to perform compensation calculation of the compensated power in another embodiment of the present disclosure. Referring to FIG. 5, in which the upper limit output power may be a function of gradual increase, the reference voltage includes a first reference voltage Vref_1 and a second reference voltage Vref_2. From the time T0 to T1, the output power of switching power supply starts to increase. When the sampled ripple voltage Vpp is less than Vref_2, the compensated output power may be controlled to increase; From the time T1 to T2, as the output power keeps increasing, the ripple voltage Vpp of the electrolytic capacitor keeps increasing under low temperature. When the sampled ripple voltage Vpp is greater than or equal to Vref_2 and less than or equal to Vref_1, the compensated output power may be controlled to be maintained. With the continuously operation of the switching power supply, the ripple current flowing through the electrolytic capacitor makes its core temperature gradually increase, and the ripple voltage Vpp of the electrolytic capacitor gradually decreases; at the time T2, the ripple voltage Vpp is less than the Vref at T2, and the compensated power may be controlled to gradually increase; until T3, the compensated power is equal to the upper limit output power, the switching power supply may be controlled to output the upper limit output power. Compared with the embodiment where the upper limit output power is a constant value, the process of output power increment may be more stable.

In the above control process, it is preferable that the first reference voltage value may be determined according to the rated ripple voltage and the over-voltage protection value of the PFC DC bus. The second threshold voltage may be set to be equal to a maximum ripple voltage of the electrolytic capacitor under fully loaded operation at room temperature. When the difference between a setting value of an overvoltage protection for the switching power supply and an average value of the electrolytic capacitor voltage is greater than or equal to the rated ripple parameter, the first threshold voltage may be the rated ripple voltage. When the twice of the difference between the setting value of an overvoltage protection for the switching power supply and the average value of the electrolytic capacitor voltage is less than the rated ripple voltage, the first threshold voltage may be the twice of the difference between the setting value of an overvoltage protection for the switching power supply and the average value of the electrolytic capacitor voltage. For example, if the setting value of an overvoltage protection for the switching power supply is 450V and an average value of the electrolytic capacitor voltage is 400V, the twice of the difference between the setting value of an overvoltage protection and an average value of the electrolytic capacitor voltage is calculated as 2*(450V−400V)=100V. Here, the rated ripple voltage is 70V. Accordingly, the first threshold voltage may be a smaller one of them, namely 70V. The first reference voltage and the second reference voltage may be adjusted according to actual needs and the present disclosure is not limited to that.

In some other embodiments, the first reference voltage Vref_1 may be equal to the second reference voltage Vref_2, the power establishment process of switching power supplies are similar to the above embodiments. The difference is that, the compensated output power is maintained when the ripple voltage Vpp is equal to the first or the second reference voltage. From the time To to T1, the output power of the switching power supply starts to increase, the ripple voltage Vpp of the electrolytic capacitor may obtained in each sampling cycle. When the ripple voltage Vpp is less than the first reference voltage Vref_1 and its output power is less than the upper limit output power P_Limit, the compensated output power may be controlled to increase, and the ripple voltage Vpp is repeatedly obtained in the next sampling cycle. At time T1, with the increasing output power of the switching power supply, when the ripple voltage Vpp of the electrolytic capacitor is greater than or equal to the first reference voltage Vref_1, the compensated output power may be controlled to be decreased, and the ripple voltage Vpp is repeatedly obtained in the next sampling cycle. Until the time T2, the ripple voltage Vpp is less than the first reference voltage Vref_1, the compensated output power may be controlled to increase again; at time T3, with the continuous increasing of the output power of the switching power supply, the ripple voltage Vpp of the electrolytic capacitor is less than the first reference value Vref_1, the compensation power may be controlled to increase till the compensation power equals to the upper limit output power P_Limit, the output power of the switching power supply may be controlled to be equal to the upper limit output power P_limit.

In some other embodiments, in step S120, the peak voltage of electrolytic capacitor voltage may be obtained in each sampling cycle to perform the compensation calculation for the current compensated output power, which specifically include:

providing the reference voltage comprising a first reference voltage and a second reference voltage;
    an electrolytic capacitor voltage of the switching power supply comprises the ripple voltage of the electrolytic capacitor;
    controlling to decrease the compensated output power and obtaining the electrolytic capacitor voltage repeatedly when a peak value of the electrolytic capacitor voltage is greater than the first reference voltage;
    controlling to maintain the compensated output power and obtaining the electrolytic capacitor voltage repeatedly when the peak value of the electrolytic capacitor voltage is less than or equal to the first reference voltage and greater than or equal to the second reference voltage;
    controlling to increase the compensated output power and obtaining the electrolytic capacitor voltage repeatedly when the peak value of the electrolytic capacitor voltage is less than the second reference voltage;

wherein the first reference voltage is less than a first threshold voltage, the second reference voltage is greater than a second threshold voltage, and the first reference voltage is greater than or equal to the second reference voltage.

In this control process, it is preferable that the second threshold voltage is set to be equal to a sum of a half maximum ripple voltage of the electrolytic capacitor under fully loaded operation at room temperature and an average value of the electrolytic capacitor voltage. When a setting value of an overvoltage protection for the switching power supply is greater than or equal to the sum of half of the rated ripple voltage and the average value of the electrolytic capacitor voltage, the first threshold voltage may be set to be equal to a sum of half of the rated ripple voltage and an average value of the electrolytic capacitor voltage. When the setting value of an overvoltage protection for the switching power supply is less than the sum of half of the rated ripple voltage and the average value of the electrolytic capacitor voltage, the first threshold voltage may be set to be equal to the setting value of an overvoltage protection for the switching power supply. The first reference voltage and the second reference voltage may be adjusted according to actual needs and the present disclosure is not limited to that.

In some other embodiments, in step S120, a valley voltage of electrolytic capacitor voltage may be obtained in each sampling cycle to perform the compensation calculation for the current compensated output power, which specifically include:

providing the reference voltage comprising a first reference voltage and a second reference voltage;
    an electrolytic capacitor voltage of the switching power supply comprises the ripple voltage of the electrolytic capacitor;
    controlling to increase the compensated output power and obtaining the electrolytic capacitor voltage repeatedly when a valley value of the electrolytic capacitor voltage is greater than the first reference voltage;
    controlling to maintain the compensated output power and obtaining the electrolytic capacitor voltage repeatedly when the valley value of the electrolytic capacitor voltage is less than or equal to the first reference voltage and greater than or equal to the second reference voltage;
    controlling to decrease the compensated output power and obtaining the electrolytic capacitor voltage repeatedly when the valley value of the electrolytic capacitor voltage is less than the second reference voltage,
    wherein the first reference voltage is less than a first threshold voltage, the second reference voltage is greater than a second threshold voltage, and the first reference voltage is greater than or equal to the second reference voltage.

In this control process, it is preferable that the first threshold voltage is set to be equal to a difference between an average value of the electrolytic capacitor voltage and half of the maximum ripple voltage of the electrolytic capacitor j under fully loaded operation at room temperature. The second threshold voltage may be set to be equal to a difference between the average value of the electrolytic capacitor voltage and half of the rated ripple voltage when the difference between the average value of the electrolytic capacitor voltage and half of the rated ripple voltage is greater than or equal to a setting value of an undervoltage protection of the switching power supply. The second threshold voltage may be set to be equal to the setting value of an undervoltage protection of the switching power supply when the difference between the average value of the electrolytic capacitor voltage and half of the rated ripple voltage is less than the setting value of an undervoltage protection of the switching power supply. The first reference voltage and the second reference voltage may be adjusted according to actual needs and the present disclosure is not limited to that.

In the embodiment described above, the first reference voltage and the second reference voltage are set respectively a constant value; or, the first reference voltage may be a first function in which a value of the first reference voltage increases gradually from a first initial value to the first threshold voltage, for example, the gradual increase from 10V to 50V. And the second reference voltage may be a second function in which a value of the second reference voltage increases gradually from a second initial value to the second threshold voltage, for example, the gradual increase from 0V to 40V. The curve of the function may include a linear increase curve, a stepwise increment curve or a nonlinear increment curve, etc. The first reference voltage and the second reference voltage may be adjusted according to actual needs and the present disclosure is not limited to that.

In some embodiments, when a plurality of electrolytic capacitors is connected in series on the PFC output bus, the voltages of each electrolytic capacitor are detected respectively. When the ripple voltage of any electrolytic capacitor wherein is greater than the first reference voltage, the compensated output power of the switching power supply may be controlled to reduce. When the ripple voltage of any electrolytic capacitor is less than or equal to the first reference voltage and greater than or equal to the second reference voltage, the compensated output power of the control switching power supply may be maintained. When the ripple voltage of any electrolytic capacitor is less than the second reference voltage, the compensated output power of the control switching power supply may be controlled to increase. Other control modes of the switching power supply are similar to the embodiments described above, and will not be described again here.

For the ripple voltage of the electrolytic capacitor, the control mode of the present disclosure does not need to detect the temperature, and is suitable for establishing the power of the switching power supply under various circumstances. Under the conditions of high temperature and normal temperature, the capacitance value of the electrolytic capacitor is large and the ESR is small. During the power establishment process, when the ripple voltage of the electrolytic capacitor is less than the reference voltage, the compensated output power obtained through the compensation calculation of the output power of the switching power supply may be greater than the upper limit output power, thus the upper limit output power determines the output power during the power establishment process, Therefore, this control method will not affect the speed of output power establishment under high temperature and normal temperature conditions. When the environment temperature is extremely low or the electrolytic capacitor deteriorates, since the capacitance value of the electrolytic capacitor becomes small and the ESR becomes large, the voltage of the electrolytic capacitor may exceed the set reference voltage, the compensated output power obtained through the compensation calculation may be less than the upper limit output power, and the switching power supply outputs the actual output power according to the compensated power. Regarding the different operating conditions like low temperature environment or electrolytic capacitor deterioration, etc., the switching power supply using the control method keeps outputting the maximum allowable power based on the current state of the electrolytic capacitor. Since the ripple voltage of the electrolytic capacitor is controlled within a safe range, switching power overvoltage may be avoided during the startup of the switching power supply, and the ripple voltage of the electrolytic capacitor is always lower than the maximum ripple voltage that the device may withstand, so the establishment process of the power of switching power supply may be highly reliable; at the same time, compared with the manner of keeping outputting a relative lower output power, waiting for the capacitance value of the electrolytic capacitor and the ESR to reduce to a reasonable range and then increasing the output power of the switching power supply, outputting the maximum allowable power based on the current state of the electrolytic capacitor may accelerate the power establishment process.

Figure 7:
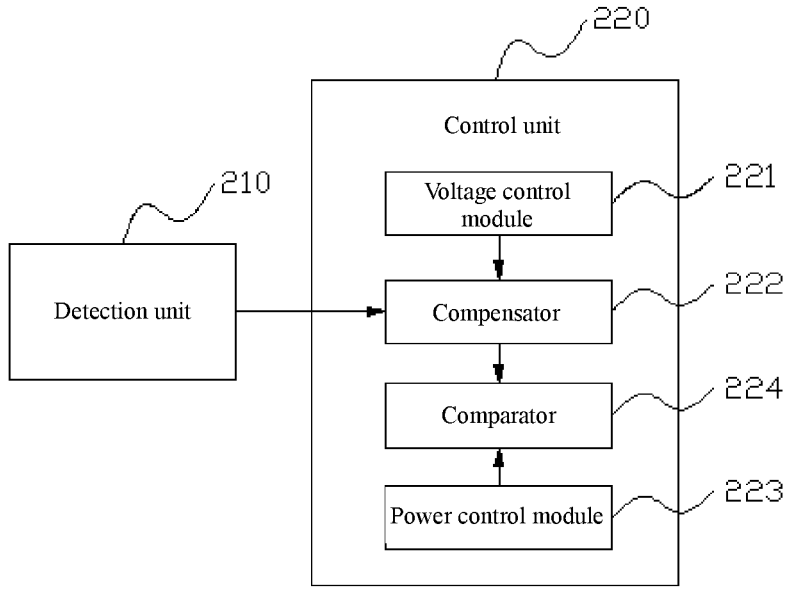
FIG. 7 is a structural diagram of a system for controlling the switching power supply according to an embodiment of the present disclosure.

FIG. 7 is a structural diagram of a system for controlling the switching power supply according to an embodiment of the present disclosure. The switching power supply comprises a power factor correction circuit which comprises at least one electrolytic capacitor. The controlling system described below and the controlling method described above may be mutually corresponded and referred to. Referring to FIG. 7, the controlling system comprises:

> a detection unit 210 configured to detect a ripple voltage of the electrolytic capacitor;
> a control unit 220 configured to control an actual output power of the switching power supply to be equal to a reference output power based on the ripple voltage of the electrolytic capacitor, so that the ripple voltage of the electrolytic capacitor may be always kept within a safe limit.

Here, the reference output power may be a compensated output power or an upper limit output power, and the compensated output power is to be obtained by comparing the ripple voltage of the electrolytic capacitor with a reference voltage and subjecting to a compensation calculation. When the compensated output power is less than the upper limit output power, the reference output power may be set to be equal to the compensated output power. When the compensated output power is greater than or equal to the upper limit output power, the reference output power may be set to be equal to the upper limit output power.

Specifically, as shown in FIG. 7, in some embodiments, the control unit 220 may include:

> voltage control module 221 configured to output a reference voltage during an operation of the switching power supply;
> compensator 222 configured to compare the ripple voltage of the electrolytic capacitor with the reference voltage, and perform a compensation calculation to output a compensated output power.
> power control module 223 configured to output an upper limit output power during the operation of the switching power supply;
> comparator 224 configured to compare the compensated output power with the upper limit output power, and output the reference output power as a smaller one of the compensated output power and the upper limit output power.

In some embodiments, the voltage control module 221 may gradually increase the reference voltage value during an operation of the switching power supply, comprising a linear increase, a stepwise increment or a nonlinear increment, or output a maximum reference voltage directly from the initial time. Similarly, the power control module 223 may also gradually increase the upper limit output power value during an operation of the switching power supply, comprising a linear increase, a stepwise increment or a nonlinear increment, or output a maximum upper limit output power directly value from the initial time. The compensator 222 may comprise a P regulator, a PI regulator, a PID regulator, a PIR regulator or a nonlinear regulator.

Figure 8:
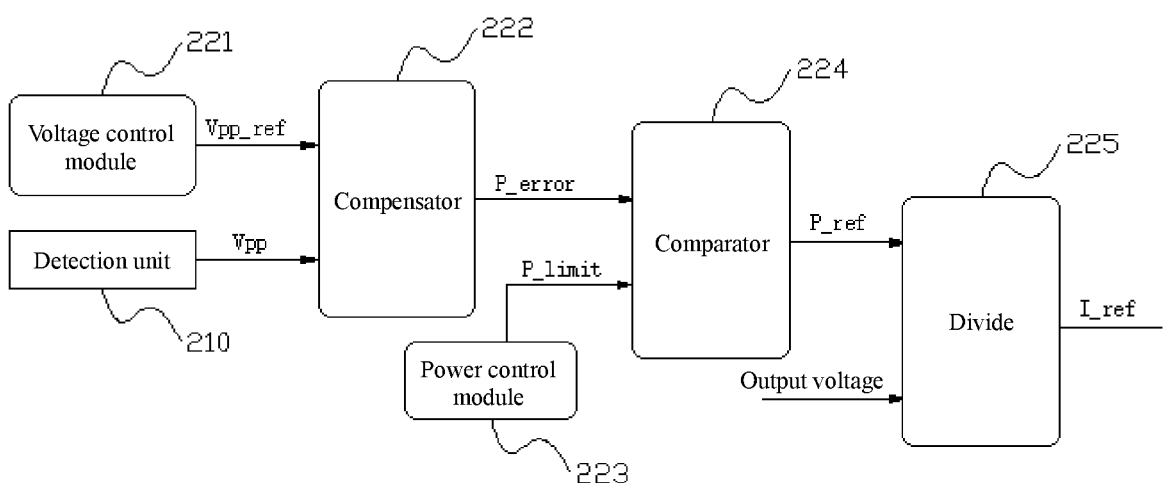
FIG. 8 is a structural schematic diagram of a system for controlling an AC/DC switching power supply according to an embodiment of the present disclosure.

FIG. 8 is a structural schematic diagram of a system for controlling an AC/DC switching power supply according to an embodiment of the present disclosure. Referring to FIG. 8, in which the voltage control module 221 may output a reference voltage Vpp_ref. The reference voltage Vpp_ref together with the ripple voltage Vpp of the electrolytic capacitor detected by the detection unit 210 may be sent to a compensator 222, and the compensator 222 may output a compensated output power P_error by a compensation calculation according to the reference voltage Vpp_ref and the detected ripple voltage Vpp. The compensated output power P_error together with the upper limit output power P_limit outputted by the power control module 223 may be sent to the comparator 224, and the comparator 224 may output a reference output power P_ref with a value equal to the smaller value of the compensated output power P_error and the upper limit output power P_limit. The reference value P_ref of the output power and the actual output voltage of the switching power supply may be sent to the divider 225 to obtain the reference value I_ref. The second converter of the switching power supply controls the output current of the switching power supply based on the reference output current I_ref, thus regulates the output power of the switching power supply and the ripple voltage of the electrolytic capacitor is controlled within the safety limit to ensure the safe operation of the switching power supply.

In the controlling system described above, the compensator 222 compares the ripple voltage of the electrolytic capacitor with the reference voltage and outputs the compensated output power after the compensation calculation. In some embodiments, the reference voltage may be outputted by the voltage control module 221 includes a first reference voltage. If the ripple voltage of the electrolytic capacitor is greater than the first reference voltage, the compensated output power may gradually decrease and the ripple voltage of the electrolytic capacitor may be repeatedly obtained in the next sampling cycle. If the ripple voltage of the electrolytic capacitor is less than or equal to the first reference voltage, the compensated output power may gradually increase. In some other embodiments, the reference voltage outputted by the voltage control module 221 includes a first reference voltage and a second reference voltage, the first reference voltage may be set to be greater than the second voltage. If the ripple voltage of the electrolytic capacitor is greater than the first reference voltage, the compensated output power may gradually decrease and the ripple voltage of the electrolytic capacitor may be repeatedly obtained in the next sampling cycle. When the electrolytic capacitor voltage is less than or equal to the first reference voltage and greater than or equal to the second reference voltage, the compensated output power may be maintained and the electrolytic capacitor voltage may be obtained repeatedly in the next sampling cycle. When the ripple voltage of the electrolytic capacitor is less than the second reference voltage, the compensated output power may gradually increase.

When the PFC converter operates, the electrolytic capacitor voltage on its may be equivalent to the superposition of an average value of the electrolytic capacitor voltage and the ripple voltage Vpp of the electrolytic capacitor. It is preferable that the electrolytic capacitor voltage may be controlled to be less than a setting value of an overvoltage protection for the switching power supply PFC output and greater than a minimum input voltage value under normal operation of the switching power supply, and the ripple voltage of the electrolytic capacitor is less than a rated ripple parameter. In some embodiments, the ripple voltage of the electrolytic capacitor may also be obtained from a peak to peak value, a peak value or a valley value of the electrolytic capacitor voltage.

In some embodiments, the detection unit 210 obtains the ripple voltage of the electrolytic capacitor from the peak to peak voltage of the electrolytic capacitor voltage in each sampling cycle, and the compensator 222 performs the compensation calculation for the current compensated output power, which specifically include:

provided the reference voltage comprising a first reference voltage and a second reference voltage;

an electrolytic capacitor voltage of the switching power supply comprises the ripple voltage of the electrolytic capacitor;

controlling to decrease the compensated output power and obtaining the electrolytic capacitor voltage repeatedly when a peak to peak value of the electrolytic capacitor voltage is greater than the first reference voltage;

controlling to maintain the compensated output power and obtaining the electrolytic capacitor voltage repeatedly when the peak to peak value of the electrolytic capacitor voltage is less than or equal to the first reference voltage and greater than or equal to the second reference voltage;

controlling to increase the compensated output power and obtaining the electrolytic capacitor voltage repeatedly when the peak to peak value of the electrolytic capacitor voltage is less than the second reference voltage;

wherein the first reference voltage is less than a first threshold voltage, the second reference voltage is greater than a second threshold voltage, and the first reference voltage is greater than or equal to the second reference voltage.

In this control process described above, it is preferable that the second threshold voltage may be set to be equal to a maximum ripple voltage of the electrolytic capacitor under fully loaded operation at room temperature. When the difference between a setting value of an overvoltage protection for the switching power supply and an average value of the electrolytic capacitor voltage is greater than or equal to the rated ripple voltage, the first threshold voltage may be set to be equal to the rated ripple voltage. When the twice of the difference between the setting value of an overvoltage protection for the switching power supply and the average value of the electrolytic capacitor voltage is less than the rated voltage, the first threshold voltage may be set to be equal to the twice of the difference between the setting value of an overvoltage protection for the switching power supply and the average value of the electrolytic capacitor voltage. The first reference voltage and the second reference voltage may be adjusted according to actual needs and the present disclosure is not limited to that.

In some other embodiments, the detection unit 210 obtains the ripple voltage of the electrolytic capacitor through the peak voltage of the electrolytic capacitor voltage in each sampling cycle, and the compensator 222 performs the compensation calculation for the current compensated output power, which may specifically include:

providing the reference voltage comprising a first reference voltage and a second reference voltage;

an electrolytic capacitor voltage of the switching power supply comprises the ripple voltage of the electrolytic capacitor;

controlling to decrease the compensated output power and obtaining the electrolytic capacitor voltage repeatedly when a peak value of the electrolytic capacitor voltage is greater than the first reference voltage;

controlling to maintain the compensated output power and obtaining the electrolytic capacitor voltage repeatedly when the peak value of the electrolytic capacitor voltage is less than or equal to the first reference voltage and greater than or equal to the second reference voltage;

controlling to increase the compensated output power and obtaining the electrolytic capacitor voltage repeatedly when the peak value of the electrolytic capacitor voltage is less than the second reference voltage;

wherein the first reference voltage is less than a first threshold voltage, the second reference voltage is greater than a second threshold voltage, and the first reference voltage is greater than or equal to the second reference voltage.

In the control process described above, it is preferable that the second threshold voltage may be set to be equal to a maximum ripple voltage of the electrolytic capacitor under fully loaded operation at room temperature. When a setting value of an overvoltage protection for the switching power supply is greater than or equal to the sum of half of the rated ripple voltage and the average value of the electrolytic capacitor voltage, the first threshold voltage may be set to be equal to a sum of half of the rated ripple voltage and an average value of the electrolytic capacitor voltage. When the setting value of an overvoltage protection for the switching power supply is less than the sum of half of the rated ripple voltage and the average value of the electrolytic capacitor voltage, the first threshold voltage may be set to be equal to the setting value of an overvoltage protection for the switching power supply. The first reference voltage and the second reference voltage may be adjusted according to actual needs and the present disclosure is not limited to that.

In some more embodiments, the detection unit 210 obtains the ripple voltage of the electrolytic capacitor from the valley voltage of the electrolytic capacitor voltage in each sampling cycle, and the compensator 222 performs the compensation calculation for the current compensated output power, which may specifically include:

providing the reference voltage comprising a first reference voltage and a second reference voltage;

an electrolytic capacitor voltage of the switching power supply comprises the ripple voltage of the electrolytic capacitor;

controlling to increase the compensated output power and obtaining the electrolytic capacitor voltage repeatedly when a valley value of the electrolytic capacitor voltage is greater than the first reference voltage;

controlling to maintain the compensated output power and obtaining the electrolytic capacitor voltage repeatedly when the valley value of the electrolytic capacitor voltage is less than or equal to the first reference voltage and greater than or equal to a second reference voltage;

controlling to decrease the compensated output power and obtaining the electrolytic capacitor voltage repeatedly when the valley value of the electrolytic capacitor voltage is less than the second reference voltage, wherein the first reference voltage is less than a first threshold voltage, the second reference voltage is greater than a second threshold voltage, and the first reference voltage is greater than or equal to the second reference voltage.

In the control process described above, it is preferable that the first threshold voltage may be set to be equal to a difference between an average value of the electrolytic capacitor voltage and half of the maximum ripple voltage of the electrolytic capacitor under fully loaded operation at room temperature. When the twice of the difference between the average value of the electrolytic capacitor voltage and half of the rated ripple voltage is greater than or equal to a setting value of an undervoltage protection of the switching power supply, the second threshold voltage may be set to be equal to a difference between the average value of the electrolytic capacitor voltage and half of the rated ripple voltage. When the twice of the difference between the average value of the electrolytic capacitor voltage and half of the rated ripple voltage is less than the setting value of an undervoltage protection of the switching power supply, the second threshold voltage may be set to be equal to the setting value of an undervoltage protection of the switching power supply. The first reference voltage and the second reference voltage may be adjusted according to actual needs and the present disclosure is not limited to that.

For the specific control process and technical effect of the system for controlling the switching power supply in the present embodiment, please refer to the description of the corresponding part in the method for controlling the switching power supply according to the embodiment described above, which will not be described again here.

To sum up, the technical solution of the present embodiments may synchronously regulate the output power according to the voltage of the electrolytic capacitor, output the maximum allowable power based on the current electrolytic capacitor state, and reduce the warm-up time required by the electrolytic capacitor under the low temperature startup condition or in case of deterioration of the electrolytic capacitor; and because the ripple voltage of the electrolytic capacitor is controlled within the safe range, the switching power supply overvoltage may be avoided during the startup process of the switching power supply, and the ripple voltage of the electrolytic capacitor is always lower than the maximum ripple voltage that the device may withstand, ensuring the safe and reliable operation of the switching power supply.

The above are only preferred embodiments of the present disclosure, and are not intended to limit the present disclosure in other forms. Any person skilled in the art may use the technical contents disclosed above to make changes or modifications into equivalent embodiments with equivalent changes and apply the same to other fields. However, any simple alterations, equivalent changes and modifications made on the embodiments above according to the technical essence of the present disclosure without departing from the content of the technical solutions of the present disclosure still belong to the scope of protection of the technical solutions of the present disclosure.

What is claimed is:

1. A method for controlling a switching power supply, the switching power supply comprising a power factor correction circuit and a DC/DC converter that are cascaded, the method comprising:

detecting a ripple voltage of a electrolytic capacitor on an output bus of the power factor correction circuit; and controlling an actual output power of the DC/DC converter to be a reference value of output power based on the ripple voltage of the electrolytic capacitor, wherein the reference value of output power is a compensated output power or an upper limit output power, wherein the compensated output power is obtained by comparing the ripple voltage of the electrolytic capacitor with a reference voltage and then subjecting to a compensation calculation, wherein when the compensated output power is less than the upper limit output power, the reference value of output power is the compensated output power; and when the compensated output power is greater than or equal to the upper limit output power, the reference value of output power is the upper limit output power.

2. The method according to claim 1, wherein the upper limit output power is a constant value which is a rated output power of the switching power supply, or the upper limit output power is a function in which the output power value increases gradually from an initial power value to a rated output power of the switching power supply, and a curve of the curve of the function comprising a linear increase curve, a stepwise increment curve, or a nonlinear increment curve.

3. The method according to claim 1, wherein the actual output voltage of the switching power supply is to be obtained, and an output current reference value is to be obtained based on the reference value of output power and the actual output voltage.

4. The method according to claim 1, wherein the compensation calculation comprises:

providing the reference voltage comprising a first reference voltage and a second reference voltage;

an electrolytic capacitor voltage of the switching power supply comprises the ripple voltage of the electrolytic capacitor;

controlling to decrease the compensated output power and obtaining the electrolytic capacitor voltage repeatedly when a peak to peak value of the electrolytic capacitor voltage is greater than the first reference voltage;

controlling to maintain the compensated output power and obtaining the electrolytic capacitor voltage repeatedly when the peak to peak value of the electrolytic capacitor voltage is less than or equal to the first reference voltage and greater than or equal to the second reference voltage;

controlling to increase the compensated output power and obtaining the electrolytic capacitor voltage repeatedly when the peak to peak value of the electrolytic capacitor voltage is less than the second reference voltage;

wherein the first reference voltage is less than a first threshold voltage, the second reference voltage is greater than a second threshold voltage, and the first reference voltage is greater than or equal to the second reference voltage.

5. The method according to claim 4, wherein the electrolytic capacitor voltage is controlled to be less than a setting value of an overvoltage protection of the switching power supply and greater than a minimum value of input voltage of the switching power supply under normal operation, and the ripple voltage of the electrolytic capacitor is controlled to be less than a rated ripple voltage, wherein, the second threshold voltage is set to be equal to a maximum ripple voltage of the electrolytic capacitor under fully loaded operation at room temperature;

the first threshold voltage is set to be equal to the rated ripple voltage when the difference between a setting value of an overvoltage protection for the switching power supply and an average value of the electrolytic capacitor voltage is greater than or equal to the rated ripple voltage; and the first threshold voltage is set to be equal to the twice of the difference between the setting value of an overvoltage protection for the switching power supply and the average value of the electrolytic capacitor voltage when the twice of the difference between the setting value of an overvoltage protection for the switching power supply and the average value of the electrolytic capacitor voltage is less than the rated ripple voltage.

6. The method according to claim 4, wherein a value of the first reference voltage and a value of the second reference voltage are constant values, or the first reference voltage is a first function in which a value of the first reference voltage increases gradually from a first initial value to the first threshold voltage, and the second reference voltage is a second function in which a value of the second reference voltage increases gradually from a second initial value to the second threshold voltage, wherein a curve of the first function and a curve of the second function individually comprising a linear increase curve, a stepwise increment curve or a nonlinear increment curve.

7. The method according to claim 1, wherein the compensation calculation comprises:

providing the reference voltage comprising a first reference voltage and a second reference voltage;

an electrolytic capacitor voltage of the switching power supply comprises the ripple voltage of the electrolytic capacitor;

controlling to decrease the compensated output power and obtaining the electrolytic capacitor voltage repeatedly when a peak value of the electrolytic capacitor voltage is greater than the first reference voltage;

controlling to maintain the compensated output power and obtaining the electrolytic capacitor voltage repeatedly when the peak value of the electrolytic capacitor voltage is less than or equal to the first reference voltage and greater than or equal to the second reference voltage;

controlling to increase the compensated output power and obtaining the electrolytic capacitor voltage repeatedly when the peak value of the electrolytic capacitor voltage is less than the second reference voltage;

wherein the first reference voltage is less than a first threshold voltage, the second reference voltage is greater than a second threshold voltage, and the first reference voltage is greater than or equal to the second reference voltage.

8. The method according to claim 7, wherein the electrolytic capacitor voltage is controlled to be less than a setting value of an overvoltage protection for the switching power supply and greater than a minimum value of input voltage of the switching power supply under normal operation, and the ripple voltage of the electrolytic capacitor is controlled to be less than a rated ripple voltage, wherein, the second threshold voltage is set to be equal to a sum of an average value of the electrolytic capacitor voltage and half of the maximum ripple voltage of the electrolytic capacitor under fully loaded operation at room temperature;

the first threshold voltage is set to be equal to a sum of half of the rated ripple voltage and an average value of the electrolytic capacitor voltage when a setting value of an overvoltage protection of the switching power supply is greater than or equal to the sum of half of the rated ripple voltage and the average value of the electrolytic capacitor voltage; and the first threshold voltage is set to be equal to the setting value of an overvoltage protection for the switching power supply when the setting value of an overvoltage protection for the switching power supply is less than the sum of half of the rated ripple voltage and the average value of the electrolytic capacitor voltage.

9. The method according to claim 7, wherein a value of the first reference voltage and a value of the second reference voltage are constant values; or the first reference voltage is a first function in which a value of the first reference voltage increases gradually from a first initial value to the first threshold voltage, and the second reference voltage is a second function in which a value of the second reference voltage increases gradually from a second initial value to the second threshold voltage, wherein a curve of the first function and a curve of the second function individually comprising a linear increase curve, a stepwise increment curve or a nonlinear increment curve.

10. The method according to claim 1, wherein the compensation calculation comprises:

providing the reference voltage comprising a first reference voltage and a second reference voltage;

an electrolytic capacitor voltage of the switching power supply comprises the ripple voltage of the electrolytic capacitor;

controlling to increase the compensated output power and obtaining the electrolytic capacitor voltage repeatedly when a valley value of the electrolytic capacitor voltage is greater than the first reference voltage;

controlling to maintain the compensated output power and obtaining the electrolytic capacitor voltage repeatedly when the valley value of the electrolytic capacitor voltage is less than or equal to the first reference voltage and greater than or equal to a second reference voltage;

controlling to decrease the compensated output power and obtaining the electrolytic capacitor voltage repeatedly when the valley value of the electrolytic capacitor voltage is less than the second reference voltage, wherein the first reference voltage is less than a first threshold voltage, the second reference voltage is greater than a second threshold voltage, and the first reference voltage is greater than or equal to the second reference voltage.

11. The method according to claim 10, wherein the electrolytic capacitor voltage is controlled to be less than a setting value of an overvoltage protection for the switching power supply and greater than a minimum value of input voltage of the switching power supply under normal operation, and the ripple voltage of the electrolytic capacitor is controlled to be less than a rated ripple voltage, wherein, the first threshold voltage is set to be equal to a difference between an average value of the electrolytic capacitor voltage and half of the maximum ripple voltage of the electrolytic capacitor under fully loaded operation at room temperature;

the second threshold voltage is set to be equal to a difference between the average value of the electrolytic capacitor voltage and half of the rated ripple voltage when the difference between the average value of the electrolytic capacitor voltage and half of the rated ripple voltage is greater than or equal to a setting value of an undervoltage protection of the switching power supply; and the second threshold voltage is set to be equal to the setting value of an undervoltage protection of the switching power supply when the difference between the average value of the electrolytic capacitor voltage and half of the rated ripple voltage is less than the setting value of an undervoltage protection of the switching power supply.

12. The method according to claim 10, wherein a value of the first reference voltage and a value of the second reference voltage are constant values; or the first reference voltage is a first function in which a value of the first reference voltage increases gradually from a first initial value to the first threshold voltage, and the second reference voltage is a second function in which a value of the second reference voltage increases gradually from a second initial value to the second threshold voltage, wherein a curve of the first function and a curve of the second function individually comprising a linear increase curve, a stepwise increment curve or a nonlinear increment curve.

13. A system for controlling a switching power supply, the switching power supply comprising a power factor correction circuit and a DC/DC converter that are cascaded, the system comprising:

a detection unit configured to detect a ripple voltage of a electrolytic capacitor on an output bus of the power factor correction circuit; and a control unit configured to control an actual output power of the DC/DC converter to be a reference value of output power based on the ripple voltage of the electrolytic capacitor; wherein the reference value of output power is a compensated output power or an upper limit output power, wherein the compensated output power is obtained by comparing the ripple voltage of the electrolytic capacitor with a reference voltage and subjecting to a compensation calculation, wherein when the compensated output power is less than the upper limit output power, the reference value of output power is the compensated output power;

when the compensated output power is greater than or equal to the upper limit output power, the reference value of output power is to the upper limit output power.

14. The system according to claim 13, wherein the control unit comprises:

a divider configured to output a reference output current of the switching power supply according to the reference value of output power and an actual output voltage of the switching power supply.

15. The system according to claim 13, wherein the control unit comprises:

a voltage control module configured to output a reference voltage during an operation of the switching power supply;

a compensator configured to compare the ripple voltage of the electrolytic capacitor with the reference voltage, and perform the compensation calculation to output the compensated output power;

a power control module configured to output the upper limit output power during the operation of the switching power supply; and a comparator configured to compare the compensated output power with the upper limit output power, and output the reference value of output power as a smaller one of the compensated output power and the upper limit output power.

16. The system according to claim 15, wherein the voltage control module is configured to increase the reference voltage gradually during an operation of the switching power supply, wherein an increment of the reference voltage comprising a linear increment, a stepwise increment or a nonlinear increment, or output a maximum reference voltage directly from an initial time.

17. The system according to claim 15, wherein the power control module is configured to increase the upper limit output power gradually during the operation of the switching power supply, wherein an increment of the upper limit output power comprising a linear increment, a stepwise increment or a nonlinear increment, or output a maximum upper limit output power directly from an initial time.

18. The system according to claim 15, wherein the compensator comprises a P regulator, a PI regulator, a PID regulator, a PIR regulator or a nonlinear regulator.

19. The system according to claim 13, wherein
the reference voltage comprises a first reference voltage and a second reference voltage;
an electrolytic capacitor voltage of the switching power supply comprises the ripple voltage of the electrolytic capacitor;
the compensated output power is controlled to be decreased and the electrolytic capacitor voltage is to be obtained repeatedly when a peak to peak value of the electrolytic capacitor voltage is greater than the first reference voltage;
the compensated output power is controlled to be maintained and the electrolytic capacitor voltage is to be obtained repeatedly when the peak to peak value of the electrolytic capacitor voltage is less than or equal to the first reference voltage and greater than or equal to the second reference voltage; and
the compensated output power is controlled to be increased and the electrolytic capacitor voltage is to be obtained repeatedly when the peak to peak value of the electrolytic capacitor voltage is less than the second reference voltage,
wherein the first reference voltage is less than a first threshold voltage, the second reference voltage is greater than a second threshold voltage, and the first reference voltage is greater than or equal to the second reference voltage.

20. The system according to claim 19, wherein the electrolytic capacitor voltage is controlled to be less than a setting value of an overvoltage protection for the switching power supply and greater than a minimum input voltage value in a normal operation of the switching power supply, and the ripple voltage of the electrolytic capacitor is less than a rated ripple voltage,
wherein,
the second threshold voltage equals to a maximum ripple voltage of the electrolytic capacitor under fully loaded operation at room temperature;
the first threshold voltage equals to the rated ripple voltage when the difference between a setting value of an overvoltage protection for the switching power supply and an average value of the electrolytic capacitor voltage is greater than or equal to the rated ripple voltage; and
the first threshold voltage equals to the twice of the difference between the setting value of an overvoltage protection for the switching power supply and the average value of the electrolytic capacitor voltage when the twice of the difference between the setting value of an overvoltage protection for the switching power supply and the average value of the electrolytic capacitor voltage is less than the rated ripple voltage.

21. The system according to claim 13, wherein the reference voltage comprises a first reference voltage and a second reference voltage;
an electrolytic capacitor voltage of the switching power supply comprises the ripple voltage of the electrolytic capacitor;
the compensated output power is controlled to be decreased and the electrolytic capacitor voltage is to be obtained repeatedly when a peak value of the electrolytic capacitor voltage is greater than the first reference voltage;
the compensated output power is controlled to be maintained and the electrolytic capacitor voltage is to be obtained repeatedly when the peak value of the electrolytic capacitor voltage is less than or equal to the first reference voltage and greater than or equal to the second reference voltage; and
the compensated output power is controlled to be increased and the electrolytic capacitor voltage is to be obtained repeatedly when the peak value of the electrolytic capacitor voltage is less than the second reference voltage,
wherein the first reference voltage is less than a first threshold voltage, the second reference voltage is greater than a second threshold voltage, and the first reference voltage is greater than or equal to the second reference voltage.

22. The system according to claim 21, wherein the electrolytic capacitor voltage is controlled to be less than a setting value of an overvoltage protection for the switching power supply and greater than a minimum input voltage value in a normal operation of the switching power supply, and the ripple voltage of the electrolytic capacitor is less than a rated ripple voltage,
wherein,
the second threshold voltage equals to a sum of an average value of the electrolytic capacitor voltage and half of the maximum ripple voltage of the electrolytic capacitor under fully loaded operation at room temperature;
the first threshold voltage equals to a sum of half of the rated ripple voltage and an average value of the electrolytic capacitor voltage when a setting value of an overvoltage protection for the switching power supply is greater than or equal to the sum of half of the rated ripple voltage and the average value of the electrolytic capacitor voltage; and
the first threshold voltage equals to the setting value of an overvoltage protection for the switching power supply when the setting value of an overvoltage protection for the switching power supply is less than the sum of half of the rated ripple voltage and the average value of the electrolytic capacitor voltage.

23. The system according to claim 13, wherein
the reference voltage comprises a first reference voltage and a second reference voltage;
an electrolytic capacitor voltage of the switching power supply comprises the ripple voltage of the electrolytic capacitor;
the compensated output power is controlled to be increased and the electrolytic capacitor voltage is to be obtained repeatedly when a valley value of the electrolytic capacitor voltage is greater than the first reference voltage;

the compensated output power is controlled to be maintained and the electrolytic capacitor voltage is to be obtained repeatedly when the valley value of the electrolytic capacitor voltage is less than or equal to the first reference voltage and greater than or equal to a second reference voltage; and the compensated output power is controlled to be decreased and the electrolytic capacitor voltage is to be obtained repeatedly when the valley value of the electrolytic capacitor voltage is less than the second reference voltage, wherein the first reference voltage is less than a first threshold voltage, the second reference voltage is greater than a second threshold voltage, and the first reference voltage is greater than or equal to the second reference voltage.

24. The system according to claim 23, wherein the electrolytic capacitor voltage is controlled to be less than a setting value of an overvoltage protection for the switching power supply and greater than a minimum input voltage value in a normal operation of the switching power supply, and the ripple voltage of the electrolytic capacitor is less than a rated ripple voltage, wherein, the first threshold voltage equals to a difference between an average value of the electrolytic capacitor voltage and half of the maximum ripple voltage of the electrolytic capacitor under fully loaded operation at room temperature;

the second threshold voltage equals to a difference between the average value of the electrolytic capacitor voltage and half of the rated ripple voltage when the twice of the difference between the average value of the electrolytic capacitor voltage and half of the rated ripple voltage is greater than or equal to a setting value of an undervoltage protection of the switching power supply; and the second threshold voltage equals to the setting value of an undervoltage protection of the switching power supply when the twice of the difference between the average value of the electrolytic capacitor voltage and half of the rated ripple voltage is less than the setting value of an undervoltage protection of the switching power supply.

* * * * *